US012645977B1

(12) United States Patent
Hansen et al.

(10) Patent No.: US 12,645,977 B1
(45) Date of Patent: Jun. 2, 2026

(54) MSR STAFFING USING AUGMENTED ANALYTICS

(71) Applicant: United Services Automobile Association (USAA), San Antonio, TX (US)

(72) Inventors: Gregory D. Hansen, San Antonio, TX (US); Andre R. Buentello, San Antonio, TX (US); Ashley R. Philbrick, San Antonio, TX (US); Jose L Romero, Jr., San Antonio, TX (US); Reynaldo Medina, III, San Antonio, TX (US); Curtis M. Bell, San Antonio, TX (US); Yevgeniy V. Khmelev, San Antonio, TX (US); Stacy Huggar, San Antonio, TX (US); Ruthie Lyle, Durham, NC (US); Victor Kwak, Frisco, TX (US); Jon D McEachron, Boerne, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 969 days.

(21) Appl. No.: 17/039,285

(22) Filed: Sep. 30, 2020

Related U.S. Application Data

(60) Provisional application No. 62/908,197, filed on Sep. 30, 2019.

(51) Int. Cl.
*G06F 17/15* (2006.01)
*G06N 20/00* (2019.01)

(52) U.S. Cl.
CPC ............. *G06N 20/00* (2019.01); *G06F 17/15* (2013.01)

(58) Field of Classification Search
CPC ............................... G06N 20/00; G06F 17/15
See application file for complete search history.

(56) References Cited

U.S. PATENT DOCUMENTS

| | | | | |
|---|---|---|---|---|
| 10,440,180 | B1 * | 10/2019 | Jayapalan | G06N 3/045 |
| 2016/0239762 | A1 * | 8/2016 | McCord | H04M 3/5175 |

OTHER PUBLICATIONS

Keblis, M., et al, Improving Customer Service Operations at Amazon. com, [received Sep. 22, 2023]. Retrieved from Internet:<https://pubsonline.informs.org/doi/abs/10.1287/inte.1060.0219>(Year: 2006).*
Defraeye, M., et al, Staffing and scheduling under nonstationary demand for service: a literature review, [received Sep. 27, 2023]. Retrieved from Internet:<https://www.sciencedirect.com/science/article/pii/S0305048315000754> (Year: 2015).*

(Continued)

*Primary Examiner* — Miranda M Huang
*Assistant Examiner* — Bart I Rylander
(74) *Attorney, Agent, or Firm* — BakerHostetler

(57) ABSTRACT

Systems and methods ingest extensive data regarding parties and contextual data to determine correlation between a variety of data types, parameters related thereto, and member service representative (MSR) contact events and corresponding staffing levels. The appropriate level of staffing, based on real-time and historical context to meet demand for calls, emails, messages, and other contact or servicing can be calculated without overstaffing.

13 Claims, 6 Drawing Sheets

300

(56)     References Cited

OTHER PUBLICATIONS

Ghanes, K., et al, Simulation-based optimization of staffing levels in an emergency department, [received on Sep. 27, 2023]. Retrieved from Internet:<https://journals.sagepub.com/doi/full/10.1177/0037549715606808> (Year: 2015).*

Gurvitch, I., et al, Staffing Call-Centers With Uncertain Demand Forecasts: A Chance-Constrained Optimization Approach, [received on Sep. 27, 2023]. Retrieved from Internet:<https://pubsonline.informs.org/doi/abs/10.1287/mnsc.1100.1173> (Year: 2010).*

Bontempi, B., et al, From Dependency to Causality: A Machine Learning Approach, [received Jun. 28, 2024]. Retrieved from Internet:<chrome-extension://efaidnbmnnnibpcajpcglclefindmkaj/https://www.jmlr.org/papers/volume16/bontempi15a/bontempi15a.pdf> (Year: 2015).*

Sung, C., et al, Data-driven Sales Leads Prediction for Everything-as-a-Service in the Cloud, [received Sep. 17, 2024]. Retrieved from Internet:<https://ieeexplore.ieee.org/abstract/document/7796942> (Year: 2016).*

Patel, S., et al, Internet of Things-IOT: Definition, Characteristics, Architecture, Enabling Technologies, Application & Future Challenges, [received Aug. 14, 2025]. Retrieved from Internet :<//efaidnbmnnnibpcajpcglclefindmkaj/https://vickychhetri.com/wp-content/uploads/2021/10/8e9af2eca2e> (Year: 2016).*

* cited by examiner

DATA INGESTION COMPONENT 202

DATA PREP COMPONENT 204

USER INTERFACE COMPONENT(S) 206

UNSUPERVISED MACHINE LEARNING COMPONENT 208

SUPERVISED MACHINE LEARNING COMPONENT 210

MSR CAPACITY DATABASE 212

CORRELATION COMPONENT 214

STAFFING SUFFICIENCY COMPONENT 216

STAFFING SOLUTION COMPONENT 218

200

MSR STAFFING USING AUGMENTED ANALYTICS

CROSS-REFERENCE TO RELATED APPLICATIONS

This patent application claims priority to and the benefit of provisional patent application 62/908,197 filed Sep. 30, 2019, which application is incorporated herein by reference in its entirety.

TECHNICAL FIELD

The field of invention relates to augmented analytics, and more particularly to determining member service representative ("MSR") or other call/contact/communication center staffing levels using augmented analytics.

BACKGROUND

Ever larger amounts of data are available to businesses and their customers. Some may come through deliberate entry or submission and retention. Other can be collected passively through the vast army of networked devices and communication channels available today. Users' locations, activities, purchasing habits, communication, et cetera, can all be aggregated when permissions are granted to access and share data. This information is dramatically more complex and fulsome than information routinely utilized in, e.g., actuarial data sets.

While a great deal of resources are committed to collecting, communicating, and aggregating this data, it is not always useful. It is overwhelming to any human observer. To begin to grasp information therein, computers have been utilized. However, it is not well understood how to best harness the use of computers in this regard.

On aspect which could be improved is the prediction of demand in staffing situations, particularly as it relates to the scalable staffing arrangements such as member service representatives (MSRs) in call centers or comparable arrangements.

SUMMARY

The needs existing in the field are addressed by the present disclosure, which relates to systems, methods, and computer usable media for predicting staffing levels capable of meeting demand for calls, email responses, message responses, et cetera, without overstaffing based on real-time and historical context.

In an embodiment, a method comprises ingesting member service representative (MSR) contact data describing at least one MSR contact event, wherein the MSR contact data is ingested to a contact record having a record format. The method also comprises ingesting contextual data describing context surrounding the at least one MSR contact event, wherein the contextual data is populated to at least one record having the record format. The method also comprises determining a correlation between the MSR contact data and the contextual data using unsupervised machine learning.

In another embodiment, a system comprises a non-transitory computer-readable medium storing instructions. The instructions are configured to effectuate a data ingestion component configured to ingest: member service representative (MSR) contact data describing at least one MSR contact event, wherein the MSR contact data is ingested to a contact record having a record format, and contextual data describing context surrounding the at least one MSR contact event, wherein the contextual data is populated to at least one record having the record format. The instructions are also configured to effectuate a correlation component configured to determine a correlation between the MSR contact data and the contextual data using unsupervised machine learning.

This summary is intended to provide a short description of some aspects only. Additional and alternative details will be apparent on review of other portions of this disclosure.

DETAILED DESCRIPTION OF ILLUSTRATIVE EMBODIMENTS

Figure 1:
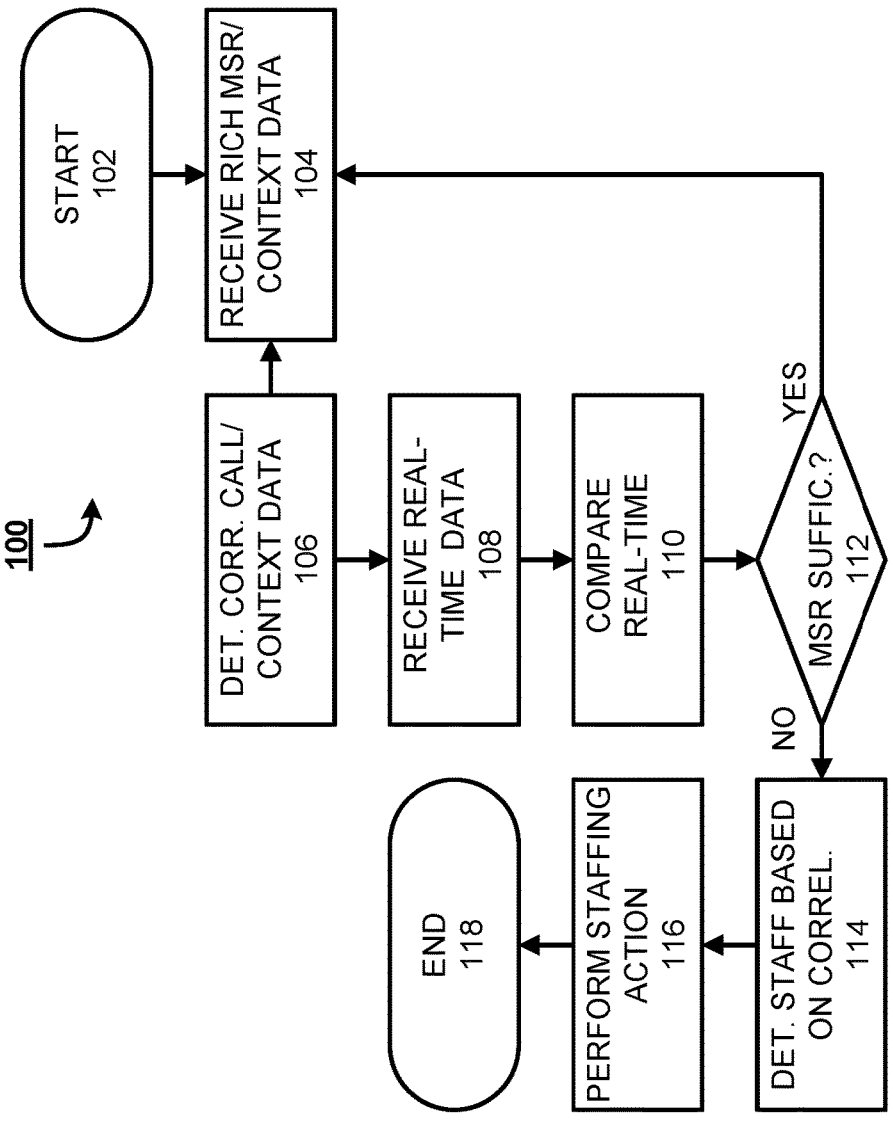
FIG. 1 is a flowchart of an example methodology disclosed herein.

Certain of the inventors' tools for analyzing data in the context of MSR staffing can be improved through the development of augmented analytics technologies, which can be used to develop actionable insights. Conventional techniques lack such capability. For example, human programmers or scientists can inject bias into the analysis cycle by creating routines that search for known relationships. Seeking to break these biases dramatically increases the labor required and does not guarantee actionable outcomes. However, without such constraints, the data is not pared down, or coincidental and irrelevant factors associated with a particular event may be distracting or increase labor. One of several problems concerns how to fully explore available data without increasing human labor burdens beyond available levels. Another such problem involves taking the results of such detailed analysis and discerning real-world actions that can be taken in response. Aspects disclosed herein provide a technological improvement and practical application of aspects described to solve these and other problems, particularly, finding correlations between context and MSR demand that identify previously unknown or unappreciated relationships and therewith produce actionable indications to proactively staff and schedule MSRs at a right-size. This avoids waste from overstaffing and service failures due to understaffing.

Embodiments herein concern the use of augmented analytics to provide actionable feedback that determines appropriate MSR staffing in a particular situation. The events, context, circumstances, statuses, etcetera, around a given date or time can be analyzed to determine which aspects thereof correlate to increases or decreases in MSR demand over a given channel (e.g., phone/voice, app, website-based chat, email, et cetera) or all channels. Circumstances or combinations of circumstances (at one time or occurring over time) can be correlated with MSR demand levels or changes in MSR demand. With these correlations discovered, the circumstances and situations occurring at later times can be monitored to assess whether parameters correlating to levels, or changing levels, of MSR demand exist. The demand or changes in demand can be compared to a current or scheduled level, and staffing actions can be taken if the projections deviate from the current or scheduled level. Organizations and networks can thereby balance supply and demand for MSR contact. Underutilized MSR staffing arrangements waste organizational resources, and ultimately drive up costs that are passed to consumers, but over-utilized MSR staffing arrangements lag in performance (e.g., time to response, time to resolution) to the frustration of parties contacting MSRs. Augmented analytics avoid both.

Artificial intelligence (AI) or machine learning (ML) herein can include a variety of techniques for discovering correlations or refining analyses performed while searching for patterns or correlations. Supervised machine learning involves training of an agent using labeled training data as a set of training examples. In this manner, examples which are provided to identify relationships can be mapped to new data where relationships are not identified. Unsupervised learning, in contrast, can analyze data that has not been labeled, classified, categorized, or otherwise prepared with details for how to identify relationships, correlations, patterns, et cetera. Reinforcement machine learning involves the ingestion of additional data to allow the AL/ML agents to self-improve based on the additional feedback or evaluation data and application of their current calculations to data representing actual outcomes based on their previous calculations. Machine learning techniques utilized herein can ingest data and determine values based on ingested data using, e.g., categorization, regression, transcription, translation/machine translation, structure output determination, anomaly detection, synthesis and sampling, imputation of missing values, denoising, density estimation or probability mass function estimation, or other techniques.

FIG. 1 illustrates an example methodology 100 for predicting MSR staffing levels. Methodology 100 begins at 102 and proceeds to 104 where rich MSR contact event data (which can also include staffing data) and/or contextual data is received. Contact events can include various fields or metadata describing the nature of the contact, parties involved, issues involved, duration, follow-up requirements, et cetera, so as to capture the total demand or cost of the interaction in terms of time and resources, some of which may be specialized (e.g., if it requires an MSR with particular training or knowledge). Received data can include historical data for both MSR contact events and context. Staffing data can include, but is not limited to, staffing and demand levels for MSRs, and particular types of MSRs (e.g., voice or text, general or specific experience, language requirements, et cetera). Contextual data can include any and all available data relating conditions that may correlate to MSR demand and/or parties who create or drive MSR demand (e.g., members, prospective members). Non-limiting examples of contextual data can include private or public events, actions, behaviors, statuses, locations, account or relationship information between entities, news, weather, time and/or date, transaction information (e.g., volumes or numbers, values or aggregates, senders and recipients), et cetera.

In embodiments, contextual data about parties driving MSR demand can include, e.g., data observable when a party contacts an MSR, as well as when they do not contact an MSR. In this manner, biases present in data that would occur by analyzing only those entities that contact an MSR (e.g., selection bias, availability bias, exclusion/inclusion biases, etcetera) can be avoided. Moreover, collecting data continuously and analyzing data before and after MSR contact can avoid length or duration bias. Thus, maximizing available data can allow both positive and negative results (e.g., how to assess the likelihood of an event or the likelihood that the same event will not occur) can be explored in the most rigorous manner. Data may be received in a prepared state, or can be prepared and processed utilizing machine learning or various rule-based approaches. While the term "machine learning" is used here, it is understood that deep learning, neural networks, and other intelligent approaches are embraced by the disclosure herein.

MSR contact data can be stored in a record associated with each entity or individual that contacts an MSR, each MSR or group of MSRs, or according to other groupings. Records can be stored in a database of similar records (e.g., describing an individual, entity, MSR, et cetera). A record can have a plurality of fields. Fields can be identified and populated by machine learning (or other techniques) during ingestion of data for analysis. Machine learning (or other techniques) can performed data preparation to strip out incongruent data, prepare relevant data, and identify patterns in a manner avoiding the biases and inefficiencies of human data scientists. Generation and updating of records can occur during data prep and ingestion. This can include population of metadata associated with identified "payload" data (e.g., the information ingested describing the entity to which the record corresponds) to describe the data itself in term of, e.g., confidence, source, time or date stamp, original format (to the extent that the payload is reformatted for database uniformity), identification of related fields in the record or other records, et cetera. Records can also have shared fields, or shared records can exist, that either refer to or populate throughout a variety of records to which they apply (e.g., data points describing events or aspects applicable to populations of more than one, such as financial market activity, political events, weather events, other public events, et cetera). Records need not be fixed in size or fields, and in embodiments, fields can be dynamically added to one or more records as identified by machine learning (or other techniques). In this regard, payload data and metadata can be organized to allow for detailed analysis of records to discover patterns or trends relating to the entity or entities at large in a consistent manner across ingested data.

It is to be understood that, with respect to one individual MSR contactor or MSR, their MSR contact data may be contextual data for a third party, and vice versa. Thus, when looking at groups of contactors and/or MSRs, each can be individually analyzed (e.g., their individual activity data can be correlated) with respect to one another. Further, contextual data need not apply specifically to any one entity, but may apply to two or more generally as discussed herein. Still further, an entity's/individual's/MSR's earlier MSR contact data may be contextual data for that party at a later time (e.g., context pertaining to that individual relating to when they initiated or received MSR contact can be correlated to future context to predict future demand).

As described herein, data or data points can be analyzed to correlate an MSR contact event to some other data point(s). The other data points can include contextual data. Contextual data can include a variety of data or data sources which can be analyzed for correlation with the event. Contextual data can be other events (e.g., eating breakfast at 6:30 AM EDT, a fire within one mile), states (e.g., the presence of particular software on a device, an account balance), other information which can be quantified or qualified, or changes and differentials thereto (e.g., driving 15 mph faster than previous day, spending more at an establishment for two successive months, setting alarm 30 minutes later two days of the week). The particular values, ranges, or incidences (e.g., whether or not something occurs, how many times it has occurred, a measurement quantifying one or more occurrences), et cetera, are parameters of the contextual data. Contextual data can be grouped in types. These can include, in non-limiting examples intended not to constrain but to suggest the spirit of possible types, such as an "app" type that would identify and characterize a mobile application as well as its usage, et cetera; a "food" type that would identify and characterize food purchased or consumed in terms of, e.g., costs, time of purchase or consumption, amounts, nutrition et cetera; a "movement" type that counts steps walked, miles driven, speed, orientation, acceleration, et cetera; and so forth. Where contextual data becomes richer, a new field can be added for new parameters (e.g., if a mobile device's health sensor is enabled and heartrate becomes available when it previously was not, a new field can be added to one or more "health" types). Contextual data can also include prevailing conditions that relate to groups or classes of entities, such as economic conditions (e.g., changes or stasis in markets, interest rates, indexes, inflation, et cetera), environmental conditions (e.g., weather events, disasters, etcetera), and even factors such as crime, traffic, time (e.g., day of week, time of day, time of year, et cetera), and so forth.

To provide further examples, contextual data can include (but is not limited to) information provided through application or periodic update questionnaires, information provided by voice, textual, or other input, as well as, where authorization is given to access one or more other sources, cellular or mobile device data (including location, owner activity, social media activity and interactions, communications with others, applications installed and application usage, web history and usage, et cetera), purchasing or spending data (including types of purchases, time of purchases, frequency of purchases, subscriptions, et cetera), vehicle data (including gas consumption, performance, driver behavior, et cetera), Internet of Things device data (e.g., data received from smart vehicles or appliances including usage, activity detected thereabout), health data (e.g., from device sensors that measure physical activity, sleep, diet, heart rate, blood pressure, etcetera; from healthcare providers, etcetera), financial data (e.g., from financial institutions, employers, et cetera), employment data, relationship data (and data from known relations such as spouses, parents, children, siblings, friends, coworkers, et cetera), educational data, marketing data, location data (for locations where a party spends time, such as economic data, crime data, health data, environmental data, income data, et cetera, or information about services available and other similar in an area), hobbies, habits, entertainment, demographic data, et cetera. Such data can relate to individuals, legal entities, groups thereof, and various other assets or properties. Each of these can be classified or characterized as a particular parameter or data type. MSR contact data can also include a confidence level associated therewith, which can rank or weight particular types of data based on their source (e.g., directly from entity to which data relates, from a source or post associated with the entity to which the data relates, from a third party), the absence or presence of corroborating data (e.g., second data point indicating a similar or related conclusion to a first data point), or other means.

MSR contact event data (including staffing data), contextual data, or other data utilized herein can include both current/real-time/rolling data about MSRs, the centers and networks in which they work, and entities driving MSR demand. Data received or available from databases can also include past data of the same type or class as the current/real-time/rolling data to allow for comparison and analysis of similar parameters or types as well as cross-analysis of disparate parameters or types. Parameters specific to contact events can relate to all contact events or particular types, and can include complexity (e.g., difficulty of issues raised by contact), number of issues, number of steps taken to handle an issue, etcetera. Contact complexity can also be described in terms of linearity, which relates to whether the contact remains on and proceeds through a single issue, or if the call transitions abruptly between issues or topics, or portions of a single issue (e.g., goes back to previously-discussed aspect, responds to questions with unrelated questions). Estimated and actual times to resolution, whether the issue is expected to be or was resolved, and the satisfaction of the contacting party can also be ingested retroactively. Additional data can include queue lengths, wait times, call volume or rate, call distribution (e.g., among particular platforms or channels), which can be grouped according to periods of time as well as absolutely. Caller identities and account information can comprise additional contact event data. MSR characteristics can also be ingested to capture staffing data, and can include (but are not limited to) experience level, known skills (e.g., product lines, types of questions, languages, troubleshooting), productivity (e.g., throughput and speed), client relationship, et cetera. In embodiments, some or all portions can also comprise contextual data, or MSR contact event data as to one event can constitute contextual data as to another.

As described, events to be correlated to context herein can be, for example, one or more MSR contact events. Types of contact can relate to (but are not limited to) calls, emails, messages (e.g., through a social media platform, through a messenger platform, integrated into an app or website), and various other ways through which current and prospective customers, members, clients, et cetera contact an organization offering support or member services with the expectation of real-time or short response communication. In embodiments, less time sensitive communications can also be considered, such as traditional paper mail, inasmuch as processing and/or responding to such correspondence still imposes a labor burden that can be analyzed and met, and so prediction of volumes and throughput can assist with proper staffing to match target service levels without overstaffing. Events can include entity action data, which includes data describing something an entity does or does not do, and which may or may not influence MSR contact events. In comparison, events that would not be characterized as "entity action data" would be events that occur in the same manner independent of entity behavior. Events that do not comprise entity action data may still influence events included in entity action data, but entity action data will rarely, if ever, influence events that are not entity action data. For example, an entity's behavior would not influence the occurrence of an earthquake, and an average entity's retirement account allocations are unlikely to move a major stock index in any observable manner; but an earthquake or stock index change may influence an entity's action and entity action data reflective thereof.

In embodiments, correlations can be analyzed for MSR contact event precursors, which can be other events that trigger MSR contact. For example, if MSRs process insurance claims, an MSR contact event precursor can be an insured loss. Examples of insured losses can include but are not limited to one or more of home damage or loss, vehicle damage or loss, personal property damage or loss, personal or business liability or loss, injury or disability, death, et cetera. By correlating such events to other context, MSR demand can be estimated.

Events and context data can include fields or parameters identifying the particular source of the data as an individual or entity as well as include fields or parameters linking the sources/entities to demographic and other details allowing for aggregation and grouping.

While an event, a caller, an MSR, or other aspects herein may be referred to in the singular, it is understood that data can be aggregated and analyzed for groups and combinations thereof. In embodiments such aggregation may be based on one or more common or similar parameter values. Thus, where the disclosure or claims recite the singular, it is understood that the plural may be used by way of techniques disclosed herein without departing from the scope or spirit of the innovation.

After MSR and context data is received at 106, correlations can be determined between MSR contact events and context data. Correlations can be found between parameters and a single event or multiple events. This involves analyzing current data, which can include but is not limited to MSR staffing data or contextual data (contextual data including but not limited to contextual data for particular contacting entities and larger data sets for all entities or relevant subsets of entities for the available history as to a given parameter or data type). Such correlations can be determined through multiple iterations of machine learning analysis. In an embodiment, unsupervised machine learning can analyze recent or current contextual data for one or more MSRs or contacting parties to determine a set of strongest correlations. For example, several hundred correlations may be identified and ranked according to the strength of correlation. Trained analysis or feedback can be provided to select or discard correlations among those identified based on whether the correlation exceeds a threshold, the value, significance, or cost of the event (e.g., where multiple MSR contact events are correlated, the complexity, specialization required, time required, er cetera, for any one MSR contact event instance), and/or the utility of a given correlation. In embodiments, the value of the event can be used as a weight in association with one or both of a correlation threshold or utility indication to assist with ranking, rather than a separate basis for selecting or discarding a given correlation. As to utility, for example, coincidental or uncontrollable correlations—such as cloudless, sunny days 52 and 37 days in Jacksonville before members in San Diego call to add new drivers to their policies—can be discarded. However, the presence and frequent use of a Dessert Destroyer gaming app on mobile phones correlating to a member's likelihood of messaging an MSR exchange-traded funds can be retained. In embodiments, the correlations presented can be filtered according to a threshold of likelihood that an event occurs at a given time or at any point in the future. This can be implemented through supervised machine learning, or involve presentation to trained personnel through a user interface and allow for human input used to determine actionable correlations. In embodiments, MSRs can be provided interfaces to assist with correlation selection or training of supervised machine learning. In embodiments, an actionable correlation is one in which the correlation informs at least one aspect within the control of an involved entity, to change the probability of an event, and/or reduce or increase correlation as to that event. For purposes of MSR staffing, this includes correlations that are predictive of changes in MSR contact event volumes, the duration and significance of MSR contact events, the categories of MSR contact events and resources to address them, etcetera.

To be "actionable," some change must be affected before the correlation and/or expected outcome based thereon becomes moot. Thus, actionable information, in some instances, must be timely. "Timely," in this context, thus means before the occurrence of an event that renders the action moot (e.g., loss of account, cancellation of product or service, sale of involved asset, enrollment with competitor for particular product or service, decrease in satisfaction or complaint) with time available to act before such inevitability; and in embodiments may also refer to being within a chronological proximity of such predicted event so that it is relevant to expected MSR demand levels (e.g., scheduling MSRs with sufficient time to adjust their schedules before predicted surge or drop-off in demand, proactively causing contact of customers expected to need MSR assistance to mitigate peaks or troughs in demand over time).

Actionability, in certain embodiments, can be based on a particular type of action (e.g., email, phone call, paper mailer, incentive or offer) is likely to result in the desired outcome (appropriate MSR staffing). "Likely" here can be relative; if a probability of certain MSR demand exceeds 25%, it may be cost-effective to increase staffing, or stay above an average required level of service while decreasing staffing. This may vary by type or group of MSR, as some may cost more or less than others. The cost of an action (e.g., marginal cost of increasing MSR staffing, the potential cost of losses if service levels dip due to excess demand on understaffed MSRs) can thereby be compared with a projected benefit (e.g., projected revenue or profit factored by the estimated revenue rate based on correlation or known statistics for MSR productivity).

Actionability, in certain embodiments, can be based on closing or reconciling a "context difference." Where the context data containing MSR contact events is analyzed for correlations with entity activity data but also include differences that independently correlate to the occurrence or non-occurrence of an MSR contact event, a correlation can be found actionable when the MSR or an associated entity can take an action to close or reconcile that difference. For example, where context data shows that service satisfaction above a certain threshold increases the likelihood that an entity does or does not contact an MSR at a certain time, the MSR or an associated entity may offer incentives, rebates, rate accommodations, or advice to assist a member with achieving that level of satisfaction. Similar actions could be taken regarding understanding of finances, products, world events; access to certain private or subscription-based information; professional or social contacts; regularity of personal contact with an MSR; et cetera. These foregoing details are provided only for purposes of example, and other options will be appreciated on review of the disclosure herein.

Actionability may additionally be based on whether any action is available. For example, if all available MSRs are already staffed, or if the cost of staffing additional MSRs is prohibitive, the determination at 110 may return negative.

Once one or more correlations are determined, at 108, real-time context data can be received. The real-time context data is analyzed and can be added to the existing database of information used to find correlations. In embodiments, real-time MSR contact event data (including real-time staffing data) can also be received and analyzed in conjunction with real-time context data in 108.

At 110, the real-time data is compared to the correlations identified and previous data. In embodiments, this can involve comparison of real-time data to some or all factors identified as correlated. Where a subset of factors is used, the subset can relate to the most strongly correlated factors (e.g., data types and/or parameters thereof). In embodiments, all correlations having data types or parameters common to the real-time data can be used as bases for comparison. In alternative embodiments, only a subset of correlations are used in comparisons based on a threshold of correlation strength, ranking of correlations, identified utility of correlations or their relationship to a controllable or uncontrollable data type or parameter, et cetera.

Based on the comparison of real-time data to correlations with MSR demand(s) from MSR contact events, a current estimated and/or projected MSR demand can be determined. The current estimated MSR demand can indicate an immediate or near-immediate demand expected, whereas a projected MSR demand can look at any time frame from the time of the analysis to any point in the future, based on the real-time and historical data. MSR demand can be estimated or projected as an aggregate value, or can be segmented according to, e.g., MSR center (e.g., call center or message response center, some or all of which may be internal to an organization or external contractors), individual agent/MSR or MSR center characteristics (MSR knowledge or skills, MSR experience level, MSR languages, time(s) to handle different types of MSR contact events, satisfaction of contacting parties), et cetera.

In embodiments where context analyzed is applicable to two or more correlations previously identified, estimated or projected MSR demand can be determined based on context having a strongest correlation with a particular MSR contact event outcome, context correlating with a most frequent MSR contact event outcome, or various aggregated correlations (e.g., summing or averaging multiple possible outcomes which can be weighted or unweighted based on the strength of correlations, et cetera). In embodiments, the results of two or more correlations can be identified as statistically unrelated (e.g., wildfires in one area and hail in another), allowing for separate demand components to be estimated or projected and added together rather than averaged.

In embodiments, estimated or projected MSR demand can be provided as an average demand, as a range of maximum and minimum possible demands, a weighted maximum possible instantaneous demand based on the strength of correlations between context (or other data) and possible outcomes (e.g., demands associated with weak correlations are still aggregated with other correlations but given low weight).

Based on the determined current estimated and/or projected MSR demand(s), at 112 a determination can be made as to whether MSR staffing (e.g., the number of MSRs available, as a whole or based on particular specialized needs) is sufficient to meet MSR demand according to a particular quality of service (e.g., all calls or messages answered by human within one minute, two minutes, etcetera). MSR sufficiency is determined through analysis of whether the current or scheduled MSR staffing will meet the estimated or projected MSR demand. Sufficiency can be associated with a utilization metric to provide flexibility, or may be benchmarked at precisely the appropriate amount of staff to meet a calculated demand. For example, at 80% utilization, an estimated 20% of MSR time would be idle with no ongoing communication, providing flexibility to scale up to increased demand. At 100% utilization, MSRs move from one call to the next with no idle time. Above 100% utilization, contacting parties begin to experience wait times as MSRs are estimated to all be simultaneously occupied while additional contact is coming in. Where quality of service is tied to specific wait times, MSR sufficiency can be determined based on wait times being at or below this length. Breaking sufficiency can be based on average wait times exceeding the time allotted under the quality of service, any one party's wait time exceeding the time allotted under the quality of service, or a threshold number of parties' wait times exceeding the time allotted under the quality of service. This can be estimated or forecast based on MSR staffing and estimated or projected demand.

If the determination at 112 returns positive, methodology 100 returns to 104 where data is updated and monitoring continues to ensure MSR sufficiency.

Alternatively or complementarily, a determination can be made as to whether MSR staffing is excessive. MSR staffing may be found excessive where utilization falls below a certain level (e.g., 80%, 70%, et cetera) for estimated or projected MSR demand.

If the determination at 112 returns negative (or, in alternative or complementary embodiments, MSR staffing is determined to be above sufficiency), at 114 a determination can be made as to what MSR staffing should be for sufficiency based on the estimate or projection (which can also involve a reduced MSR staffing level in embodiments estimating or projecting excess capacity). This determination at 114 can utilize known correlations or perform additional analysis (including, e.g., one or more of or iterations of, supervised machine learning and unsupervised machine learning) to determine a sufficient MSR staffing level or solution. Alternatively or complementarily, the determination at 114 can be based on rules or historical levels for particular demand. In embodiments, the staffing level or solution can be a point solution (e.g., number and type of MSRs to hit a specific utilization target), or a range/criteria solution (e.g., within a range of utilizations for one or more MSR characteristics).

Thereafter, at 116, staffing action can be performed. In embodiments, staffing action can involve automated scheduling and adjustment of shifts, whereby scheduling, staffing, or calendar software is automatically updated to add or remove MSRs from scheduled shifts, or change the lengths, start times, or end times of previously-scheduled or new shifts. In embodiments, notifications can be sent to inform involved parties of the changed shifts, confirm existing shifts, and receive feedback regarding an MSR's ability to staff the shift. In embodiments, MSRs can be prioritized for particular shifts or at large based on their skills, experience or length of service as an MSR, other hours worked, performance reviews or customer satisfaction, location, pay rates, et cetera, and lower-priority MSRs can be tentatively scheduled if a higher-priority MSR declines a scheduled shift, or does not accept a tentatively scheduled shift within a time frame (e.g., 12 hours after shift scheduled, 48 hours before shift scheduled to start, et cetera). Alternatively, recommendations can be sent to involved parties (e.g., MSRs, MSR managers, contract managers where contractors supplement internal MSRs, et cetera) to allow for manual follow-up to meet estimated or projected MSR demand at a point in time. Following staffing action, methodology 100 can end at 118, or recycle to any other aspect of the methodology (e.g., 104, 108, et cetera).

In various embodiments, aspects at 116 (or elsewhere) can determine a trigger for initiating an action to modify staffing.

In various embodiments, triggers can be set for immediate or "when able," on-demand at a time to be determined, scheduled for a specific time, or based on the occurrence or non-occurrence of an event. Examples can include, but are not limited to, immediate increase or decrease in MSR staffing; change on detection of a particular circumstance; scheduled change at a specific time; et cetera. As will be understood, these brief examples (like all herein) are provided for purposes of example only, and the issues, events, times, communication channels, triggers, et cetera, and MSRs for servicing each, can vary without departing from the scope or spirit of the innovation.

Aspects at, e.g., 112 or 116, or in alternative or complementary embodiments elsewhere in methodology 100, natural language processing can be utilized to more clearly communicate inputs and outputs related to the analyses. For example, effectuation of an action at 116 can be processed through natural language processing to automatically effectuate details regarding staffing changes and reasons therefor, or provide instructions to an MSR or third party to assist with staffing changes. In alternative or complementary embodiments, a query can be posed by an MSR or manager, or by a third party, to a system operating methodology 100 or aspects thereof and natural language processing can be used to initiate analyses using techniques described herein to provide a response to the query, which can be converted back to natural language to respond. For example, a question may be posed as to when weather is next correlated to change staffing levels. In these and other instances, available contextual data can be analyzed to provide feedback likely to provide understandable outputs. Finally, natural language processing can be utilized, in alternative or complementary embodiments, at 104 or other instances where data is ingested, allowing non-technical users to describe the data or a data point value such that it can be ingested and utilized to populate fields in user records.

As suggested, techniques herein need not be standalone machine techniques, but may be used to augment one or more human MSRs, managers, supervisors, et cetera, who are adjusting or managing MSR staffing levels. For example, a trigger to cause updated analysis can be scheduled based on scheduled shifts, management preferences, new hires or departures, et cetera. Before or during shifts (in the short-, mid-, or long-term), MSRs or their leaders may receive actionable insights to make adjustments to achieve sufficient (e.g., not exceeding minimum service levels/wait times) and/or efficient (e.g., maximum proportion of time idle for one or more MSRs during shift) staffing based on analyses herein. Moreover, while "MSR" is generally used in the context of one membership organization's representatives, in embodiments data sharing may occur between multiple organizations and techniques herein can be leveraged to provide third parties or complementary representatives capabilities to better service individuals. In this manner, systems, methods, products, services, et cetera described herein can be "organization agnostic."

Figure 2:
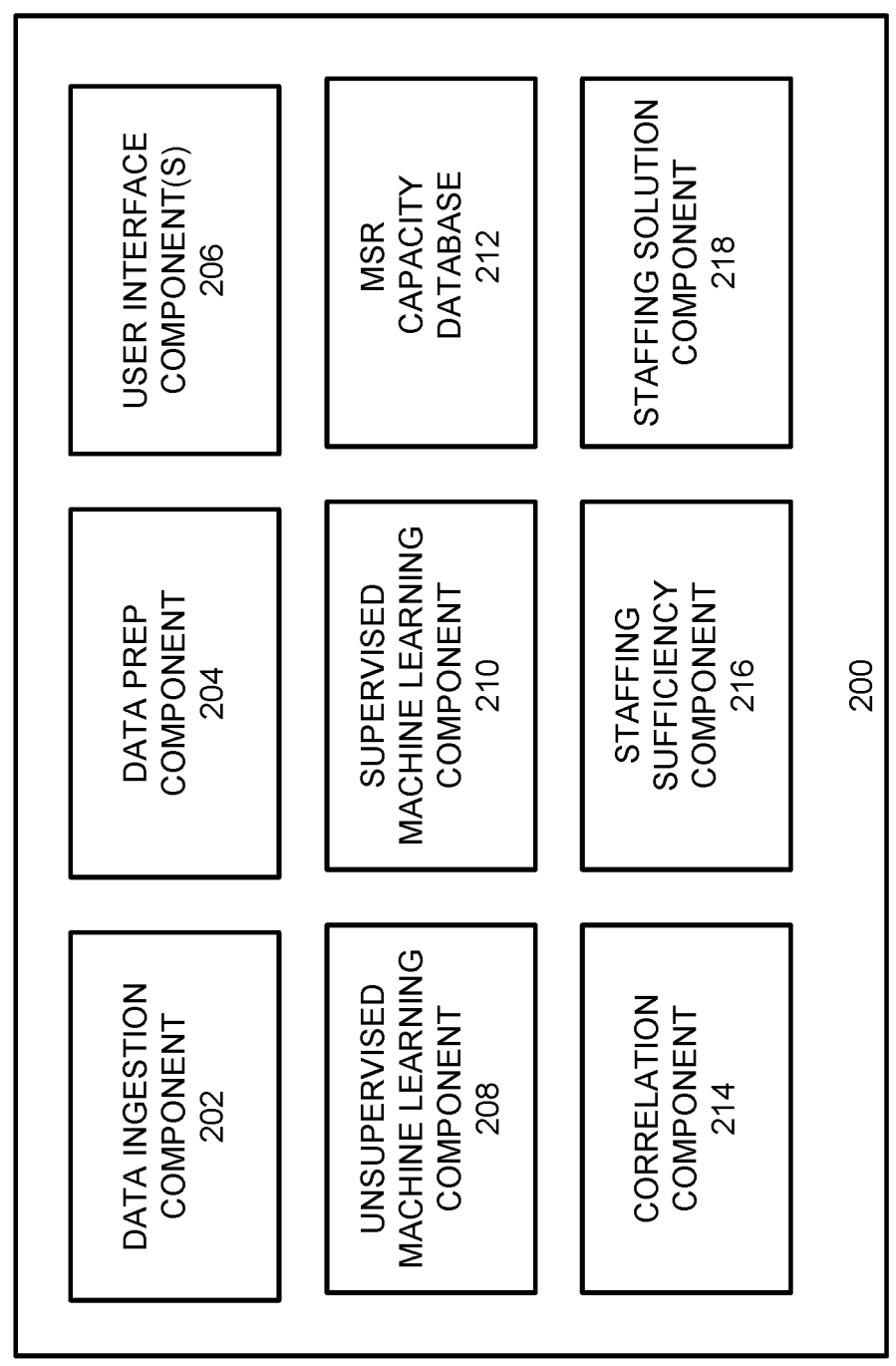
FIG. 2 is a block diagram of an example system disclosed herein.

FIG. 2 illustrates an example system 200 for predicting and managing MSR staffing needs in response to correlations of current or predicted context with MSR contact events. System 200 includes data ingestion component 202, data preparation component 204, user interface component(s) 206, unsupervised machine learning component 208, supervised machine learning component 210, MSR capacity database 212, correlation component 214, staffing sufficiency component 216, and staffing solution component 218.

Data ingestion component 202 can be one or more communicative connections to various data sources, and can serve as an intermediary between one or more databases (including but not limited to MSR capacity database 212) and other components herein. In embodiments, data ingestion component can include various interfaces to devices or network locations to receive current/real-time/continuous context data regarding entities, both for analysis and to build MSR capacity database 212.

Data preparation component 204 can prepare data according to its class or type to complete ingestion and allow for its systematic storage in, e.g., MSR capacity database 212. Preparation can occur using supervised machine learning, and may utilize unsupervised machine learning or reinforcement machine learning based on results from supervised machine learning over time. Data preparation component 204 can reduce the labor component of analysis for large sets of data from known data streams, and may correlate new data streams to known data types to establish a new data structure or type for its consistent storage and ease of analysis thereafter. Data preparation can include arranging the data according to records, which can have predetermined or unconstrained field options (and, in the latter case, machine learning or other techniques may define new fields on-the-fly), and can include metadata associated with payload data to reflect the age, associated confidence level, source, et cetera, of said respective payload data or other record information. Records as described herein, or "raw" or otherwise-arranged MSR staffing data, MSR contact event data, and/or contextual data, can be stored in MSR capacity database 212 and/or other databases.

User interface component(s) 206 can be one or more components or subcomponents that communicate with one or more of data sources, an MSR, a party contacting an MSR, MSR managers, or others. User interface component(s) 206 can be graphical user interfaces on applications (desktop or mobile) or websites, application programming interfaces (APIs), or other means for providing and/or receiving data.

Unsupervised machine learning component 208 provides unsupervised machine learning capability and can analyze one or more events (e.g., contact frequencies, volumes, or types over different MSR contact channels) and parameters or historical data to determine whether any correlations exist between a given MSR contact event (or series of events) and various ingested data points defining context around the event or similar events/event types. Supervised machine learning component 210 provides supervised machine learning capabilities and can analyze one or more events and parameters or historical data to determine whether correlations exist with that event based on its training, which can change over time.

Correlations can be saved to a correlation data type with attributes quantifying the strength of particular correlations (based on. e.g., the confidence in underlying data and/or the quantitative amount of correlation). Correlations can involve interactions of two, three, or more parameters, as absolutes or over periods of time, and such periods of time can be the same or differ for one or more of the parameters (e.g., individual or aggregate parameters/data points analyzed to determine whether a user is likely to contact an MSR could include daily minutes of use of application on mobile phone, weekly level of physical exercise, two highest dollar amounts spent at coffee shops, number of rainy days in two month period, number of speeding tickets issued in an area in one week, movements of a stock index of more than two percent, conflict in a particular region, pandemic, et cetera).

In embodiments, separate data types or data structures can be provided for correlations based on whether they are analyzed by unsupervised machine learning or supervised machine learning. In such implementations, duplicate or highly similar correlations may be found, but confidence or data resolution can be increased through subsequent analyses performed with different types of machine learning. In embodiments, a common data type can be used, but a field or parameter can indicate the type(s) of machine learning applied to the correlation discovered.

In embodiments, new correlations showing relationships between existing correlations by analyzing different entries or sets of correlation type data in reference to one another. In this regard, the presence of one correlation may not provide significant predictive effect, but the presence of multiple correlations, or correlated correlations, could provide insight as to the likelihood of a particular event or the absence thereof. Thus, one or both of unsupervised machine learning component 208 and supervised machine learning component 210 can analyze stored correlations in reference to events as the amount of correlation data grows. In embodiments, conducting this type of analysis in real-time or over historical data can be used by reinforcement machine learning to improve the predictive capability of the system based on context correlated with particular outcomes or events.

In embodiment, a reinforcement machine learning component can also be provided, but may be a subcomponent (or multiple subcomponents) of unsupervised machine learning component 208, supervised machine learning component 210, and/or correlation component 214. Moreover, one or both of unsupervised machine learning component 208 and/or supervised machine learning component 210 can be subcomponents of correlation component 214, vice versa, depending on the architecture of system 200.

MSR capacity database 212 can be a database for storing event data, such as MSR contact event data and including MSR staffing data, contextual data, and other data, as well as correlation data from analysis thereof. MSR capacity database 212 can maintain even initially unhelpful data, such as discarded correlations, for later re-analysis to determine whether apparently inconsequential correlations vanish over time or persist. Where previously discarded correlations persist, if the length of persistence or level of correlation increases above a threshold, the discarded correlation may be flagged, promoted, or reinserted into the active (e.g., not discarded) correlations for consideration.

Correlation component 214 can be provided to manage correlations discovered by unsupervised machine learning component 208 or supervised machine learning component 210, and/or determine correlations by other techniques not involving machine learning. For example, correlation component 214 can utilize probabilistic programming, discrete math, linear programming, expert systems, et cetera. Moreover, correlation component can include a rule-based or machine learning approach to managing data analyzed or correlations discovered by unsupervised machine learning component 208 or supervised machine learning component 210, for example, by determining a data set is too small or short to be statistically relevant and blocking its analysis until more data is received or discarding correlations with which the small data set is involved, or until the confidence level(s) of respective contextual data points involved in the correlation are near certain (e.g., confidence over 90%).

Staffing sufficiency component 216 can determine estimated or projected MSR demand(s) based on correlations, and can also compare the estimated or projected MSR demand(s) against actual or scheduled MSR staffing. As discussed, this can be highly specific or confirm more general compliance with rules or ranges allowing some flexibility. This can be conducted continuously on a real-time basis as more data is ingested, or occur on a periodic basis (e.g., intervals of minutes or hours, daily, intervals of days, weekly, on particular days of the week or dates, etcetera).

Staffing sufficiency component 216 (or another component) can also be used to determine a context difference and determine one or more actions to reconcile or close the context difference. Actions reconciling or closing context difference can be assessed by staffing solution component 218 to determine their feasibility and/or plan or cause their implementation.

Staffing solution component 218 can determine and implement adjustments to MSR staffing levels for one or more times based on estimated or projected MSR demand(s). This can be satisfied using correlations between MSR demand and outcomes, and/or other techniques described herein. This can also be conducted continuously on a real-time basis or on a periodic basis.

In embodiments, staffing solution component 218 can be provided MSR cost correlation information and determine MSR staffing according to an economic metric (e.g., cost or profitability) to constrain solutions from becoming unreasonably expensive.

In embodiments, supervised machine learning component 210 (or other supervised machine learning) can be used to determine realistic staffing solutions, such as those that can reasonably be implemented based on available centers, equipment, and personnel (internal and contracted) available. User input may be received for the same purposes, and may be ingested (e.g., using one or both of user interface component(s) 206 and data ingestion component 202) for training of supervised machine learning or reinforcement learning. Staffing sufficiency component 216 can leverage and is operatively coupled with other components of system 200, including. e.g., user interface component(s) 206, unsupervised machine learning component 208, supervised machine learning component 210, correlation component 214, staffing solution component 218, et cetera, to determine staffing solutions and communicate them to involved parties (e.g., automated systems, MSRs, MSR managers, et cetera). Staffing solutions identified can define a data type or class, and can be stored in MSR capacity database 212.

In alternative or complementary embodiments, system 200 can include a natural language processing component, or one or more of data ingestion component 202, data prep component 204, staffing sufficiency component 216, and/or staffing solution component 218 can include a natural language processing subcomponent. In system 200 (or other systems and methods disclosed herein), natural language processing can be utilized to more clearly communicate inputs and outputs related to the analyses. For example, effectuation of an action by staffing solution component 218 can be processed through natural language processing to automatically effectuate details regarding staffing changes and reasons therefor, or provide instructions to an MSR or third party to assist with staffing changes. In alternative or complementary embodiments, a query can be posed by an MSR or manager, or by a third party, to system 200 or components thereof, and natural language processing can be used to initiate analyses using techniques described herein to provide a response to the query, which can be converted back to natural language to respond. For example, a question may be posed as to when weather is next correlated to change staffing levels. In these and other instances, available contextual data can be analyzed to provide feedback likely to provide understandable outputs. Finally, natural language processing can be utilized, in alternative or complementary embodiments, with data ingestion component 202 or data prep component 204, allowing non-technical users to describe the data or a data point value such that it can be ingested and utilized to populate fields in user records.

Figure 3:
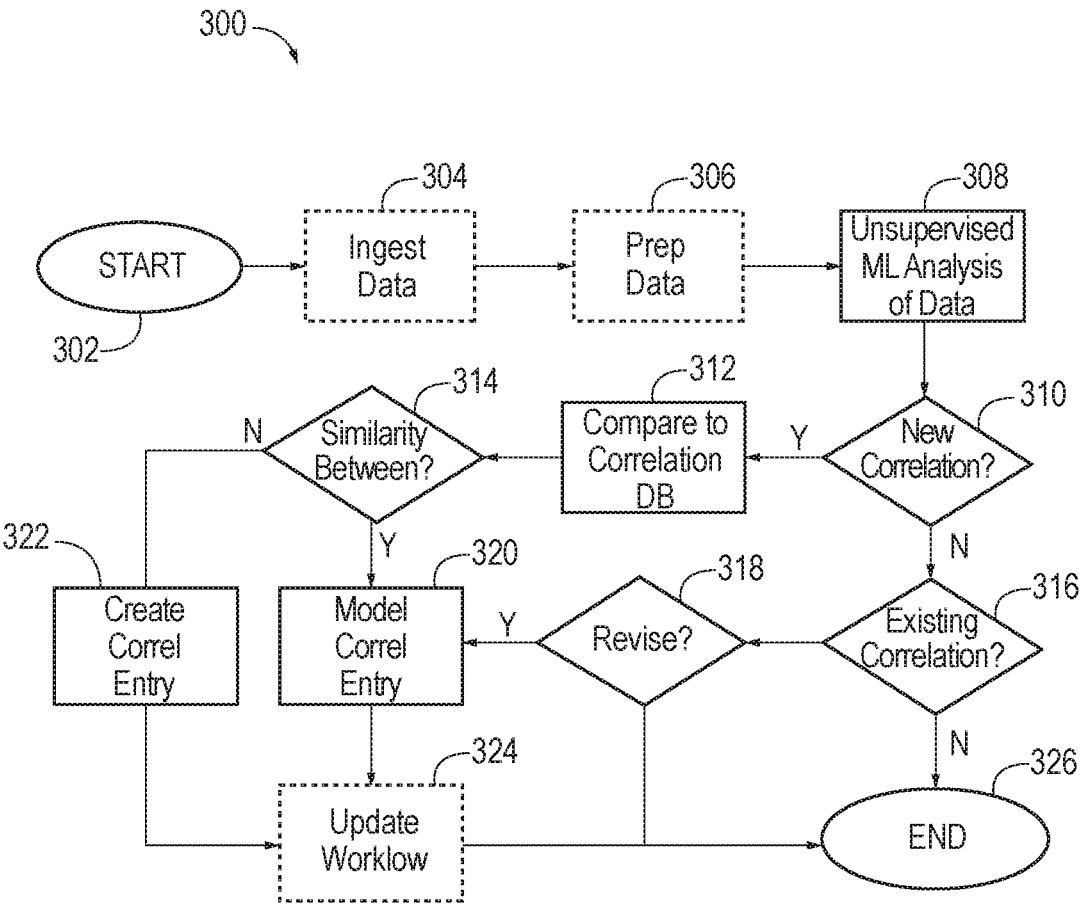
FIG. 3 is a flowchart of an example methodology disclosed herein.

FIG. 3 illustrates another example methodology 300 for leveraging augmented analytics. Methodology 300 begins at 302 and proceeds to 304 where, in embodiments, data can be ingested. Data ingested can include (but is not limited to) data types or data from sources described herein. Data can relate to one or more MSR contact events or contextual data about MSRs or parties who may or do contact MSRs. Data can include individual data about the individual entities who contact MSRs or MSRs themselves stored in records, data on events (related or unrelated to the entity or entities), and any other available data.

At 306, data can be prepared in embodiments. Preparation of data can involve conversion or reformatting, normalization, or other processes to make all ingested data common and usable. In embodiments, ingested data can be statistically analyzed and outliers can be subjected to further analysis to determine whether they should be weighted or discarded if erroneous or result in skewing of a corresponding data set. Preparation can be concurrent with or part of ingestion such that both are completed after the data is appropriately formatted for storage according to a data structure for the particular type or source. Metadata can be appended to payload data, or records in general, to assist with identifying source, confidence, age, et cetera.

In embodiments where data is already available, methodology 300 can optionally start at 308. Regardless of when initiated, at 308, data can be analyzed for correlation of different datapoints. In embodiments, one or more events can be identified in the data, and context and other events (concurrent, past, or, in embodiments, following the event) can be correlated, whether causative or coincidental. Examples of MSR contact events can include but are not limited to, e.g., an MSR receiving a communication over one or more channels regarding an insured loss, an occurrence of fraud, the over- or under-staffing of a call center, a change to membership or accounts, etcetera. Events, generally, can also comprise the contextual data correlated against or with the MSR contact events.

After determining one or more correlations, a determination is made as to whether a new correlation (e.g., finding correlation between data types, certain ranges of data types, or combinations of data types not previously associated with the event) is found at 310. If the determination returns negative, methodology 300 proceeds to 316 where a determination is made as to whether an existing correlation is found. If the determination at 316 returns negative, no correlations were found and methodology 300 can end at 324.

If the determination at 310 returns positive, and a new correlation between events or events and surrounding context has been discovered, the correlation can be compared to others in a database storing previously correlated events and context at 312. As suggested, groups of events, or sets comprising a series of similar-typed events, can be used to discover a correlation as opposed to viewing each event in isolation and as an independent driver of correlation. A determination is made at 314, based on the comparison as to the similarity. If the comparison determines that the correlation is dissimilar to others, a new correlation entry can be made in the database at 322, unrelated and unlinked to others.

A correlation data structure, by which correlations can be stored, can include the data type or source correlated, parameters related thereto (values, ranges, times, incidences, recurrence, et cetera), the strength of the correlation, confidence in the underlying information, and other information. A correlation data structure can then be used as a basis for comparison. For example, an entity can provide data including some or all of the data types and sources analyzed to discover correlations. Where data matches some or all of the kinds and corresponding parameters in a correlation entry, actions to validate or modify MSR staffing can be taken based on the likelihood (or absence thereof) regarding the events correlated with those other events or context. Such actions can include but are not limited to causing scheduling or staffing, or sending notifications regarding scheduling or staffing, to confirm, offer, add, remove, edit, et cetera, one or more MSR shifts.

Returning to the methodology, if the determination at 314 returns positive, methodology 300 proceeds to 320. This aspect is also reached by way of 316. If the determination at 316 returns positive, methodology 300 proceeds to 318 where a determination is made as to whether the existing correlation entry identified should be revised. This can be determined based on any differences between the existing correlation and the one discovered at 308. Supervised machine learning, statistical analyses, data representing feedback from human review, or other techniques can be utilized to confirm an existing correlation and whether differences in the correlation are such that an existing entry should be revised based on identification of the same correlation with certain differences (e.g., wider or narrower range of parameters for a correlated type of context). If the determination at 318 returns negative, no further changes are required, and methodology 300 proceeds to end at 326, or may recycle to, e.g., 304, 308, or another aspect.

If the determination at 318 returns positive, methodology 300 proceeds to 320. Whether reached by 318 or 314, at 320, a correlation entry is used either to create a new entry (e.g., as a model) or to modify the existing entry. In this manner, an entry is created or updated to reflect the most recent data and/or analyses.

Following 320 or 322, methodology 300 can, in embodiments, proceed to 324 where a workflow can be updated. Updating a workflow can include taking, changing, or stopping from various actions based on identified correlations to increase or decrease correlations or the likelihood of an event's occurrence or absence (including, but not limited to, MSR demand at a given time or under given circumstances). Thereafter, at 324, methodology 300 can end at 326, or alternatively recycle to another aspect such as, e.g., 304, 308, et cetera.

Figure 4:
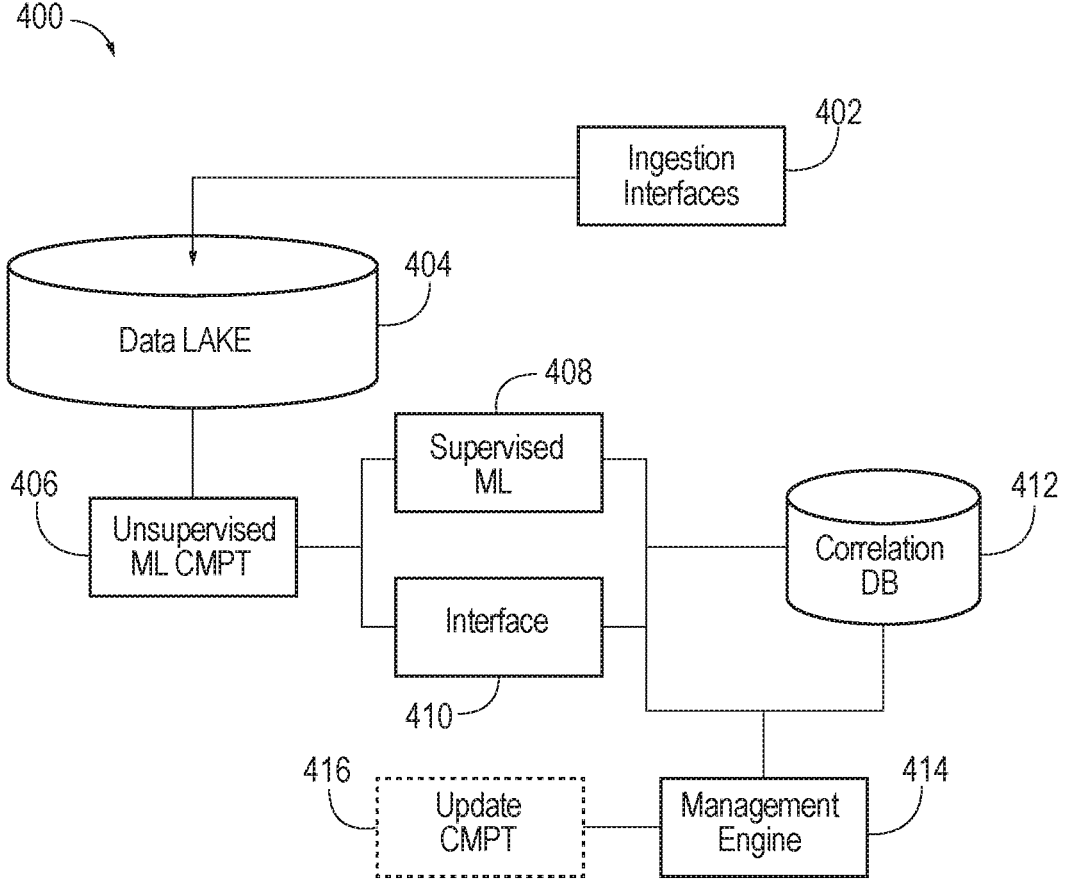
FIG. 4 is a block diagram of an example system disclosed herein.

FIG. 4 illustrates a system 400 for implementing aspects disclosed herein.

System 400 includes ingestion interfaces 402 for receiving event data and context data, which can include access to other databases, application programming interfaces, graphical user interfaces, and other means for receiving data. Data lake 404 can receive information from ingestion interfaces 402 and be a comprehensive store of event data and context data.

Unsupervised machine learning component 406 can perform unsupervised machine learning on ingested data and historical data to ascertain correlations between one or more particular events (which can include but is not limited to, e.g., MSR staffing demand) and context/data points. All correlations, whether causative (or related in some other manner) or coincidental (or otherwise unrelated but for the correlation), can be determined using unsupervised machine learning.

Supervised machine learning component 408 and/or correlation interface 410 can be used to analyze the correlations discovered. Correlation interface 410 can bean input/output interface configured to provide information to a human operator and receive data representing their feedback, or can be an interface connecting to another system or component for reviewing correlations. Supervised machine learning component 408 can include supervised machine learning trained to select or discard correlations based on determinations as to whether they are causative or coincidental, whether they meet static or variable thresholds for correlation, whether they include any aspects controllable by a party involved or affected by the event or context, or other bases. One or both of supervised machine learning component 408 and correlation interface 410 can be used to select correlations with utility for actionable decisions.

Correlation database 412 can store correlations found between various event data and context data, and various feedback or changes based thereon. In embodiments, all correlations can be stored along with indications of whether such were selected or discarded. In embodiments, event or contextual data can also be stored in correlation database 412.

Management engine 414 can access correlation database to provide actionable feedback based on correlations identified. In embodiments, management engine can be operatively coupled with one or more interface (including but not limited to ingestion interfaces 402 and/or correlation interface 410) to receive information about a particular entity having context and determine whether that entity has correlation with an event or non-event.

Based on a determination of correlation to an event or non-event by management engine 414, update component 416 can determine actions to take to increase or decrease correlation or otherwise increase or decrease the likelihood of a particular outcome through use of supervised machine learning component 408, unsupervised machine learning component 406, or other ile-based or statistical analysis of correlations in correlation database 412. In embodiments, update component can automatically update various policies, rules, automated actions, or other communicatively coupled systems or tasks in response to the correlation. This can include changing an action (such as those described throughout this disclosure effecting MSR staffing levels), providing a credit, imposing a penalty, modifying a policy or contract, modifying a management term or rule, et cetera.

Figure 5:
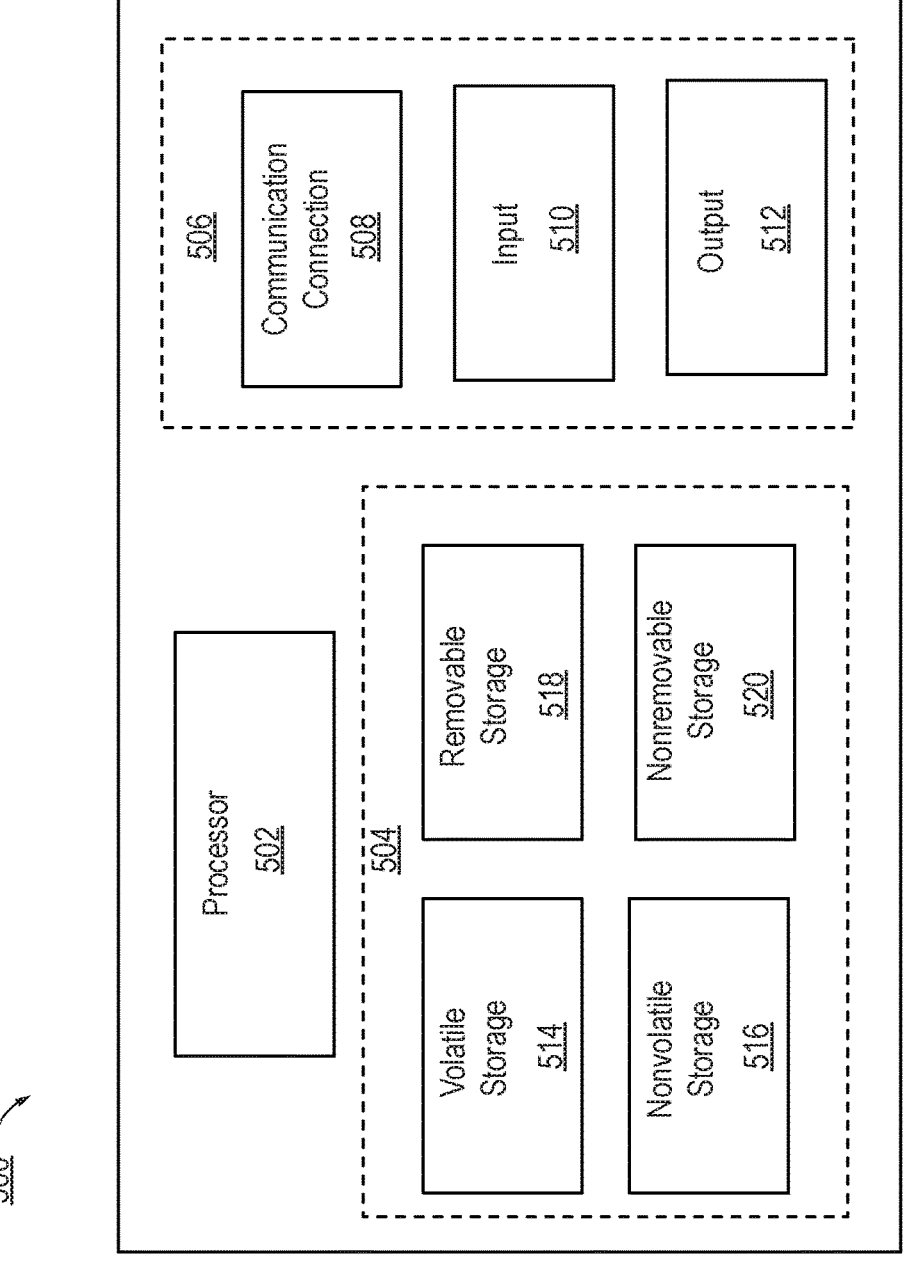
FIG. 5 is a block diagram illustrating an example implementation of a device which can be utilized in conjunction with or comprise a portion of systems disclosed or implement or execute methods herein.

Aspects disclosed herein can be implemented using computer devices and networks. FIG. 5 illustrates a device 500. Device 500 may comprise all or a part of modules or components herein. Device 500 may comprise hardware or a combination of hardware and software. The functionality to facilitate telecommunications via a telecommunications network may reside in one or combinations of links, portals, or connections. Device 500 depicted in FIG. 5 may represent or perform functionality of an appropriate device 500, or combination of modules or components herein. It is emphasized that the block diagram depicted in FIG. 5 is an example and not intended to imply a limitation to a specific implementation or configuration. Thus, device 500 may be implemented in a single device or multiple devices. Multiple network entities may be distributed or centrally located.

Multiple network entities may communicate wirelessly, via hard wire, or any appropriate combination thereof.

Device 500 may comprise a processor 502 and a memory 504 coupled to processor 502. Memory 504 may contain executable instructions that, when executed by processor 502, cause processor 502 to effectuate operations associated with aspects disclosed herein. As evident from the description herein, device 500 is not to be construed as software per se.

In addition to processor 502 and memory 504, device 500 may include an input/output system 506. Processor 502, memory 504, and input/output system 506 may be coupled together (coupling not shown in FIG. 5) to allow communications there between. Each portion of device 500 may comprise circuitry for performing functions associated with each respective portion. Thus, each portion may comprise hardware, or a combination of hardware and software. Accordingly, each portion of device 500 is not to be construed as software per se. Input/output system 506 may be capable of receiving or providing information from or to a communications device or other network entities configured for telecommunications. For example input/output system 506 may include a wireless communications (e.g., WiFi/2.5G/3G/4G/5G/GPS) card. Input/output system 506 may be capable of receiving or sending video information, audio information, control information, image information, data, or any combination thereof. Input/output system 506 may be capable of transferring information with device 500. In various configurations, input/output system 506 may receive or provide information via any appropriate means, such as, for example, optical means (e.g., infrared), electromagnetic means (e.g., RF, WiFi, Bluetooth®, ZigBee®), acoustic means (e.g., speaker, microphone, ultrasonic receiver, ultrasonic transmitter), or a combination thereof. In an example configuration, input/output system 506 may comprise a WiFi finder, a two-way GPS chipset or equivalent, or the like, or a combination thereof.

Input/output system 506 of device 500 also may contain communication connection 508 that allows device 500 to communicate with other devices, network entities, or the like. Communication connection 508 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 506 also may include an input device 510 such as keyboard, mouse, pen, voice input device, or touch input device. Input/output system 506 may also include an output device 512, such as a display, speakers, or a printer.

Processor 502 may be capable of performing functions associated with aspects described herein. For example, processor 502 may be capable of, in conjunction with any other portion of device 500, managing social media communications as described herein.

Memory 504 of device 500 may comprise a storage medium having a concrete, tangible, physical structure. As is known, a signal does not have a concrete, tangible, physical structure. Memory 504, as well as any computer-readable storage medium described herein, is not to be construed as a signal. Memory 504, as well as any computer-readable storage medium described herein, is not to be construed as a transient signal. Memory 504, as well as any computer-readable storage medium described herein, is not to be construed as a propagating signal. Memory 504, as well as any computer-readable storage medium described herein, is to be construed as an article of manufacture.

Memory 504 may store any information utilized in conjunction with telecommunications. Depending upon the exact configuration or type of processor, memory 504 may include a volatile storage 514 (such as some types of random access memory (RAM)), a nonvolatile storage 516 (such as ROM, flash memory), or a combination thereof. Memory 504 may include additional storage (e.g., a removable storage 518 or a nonremovable storage 520) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by device 500. Memory 504 may comprise executable instructions that, when executed by processor 502, cause processor 502 to effectuate operations for, e.g., listening to social media activity.

Figure 6:
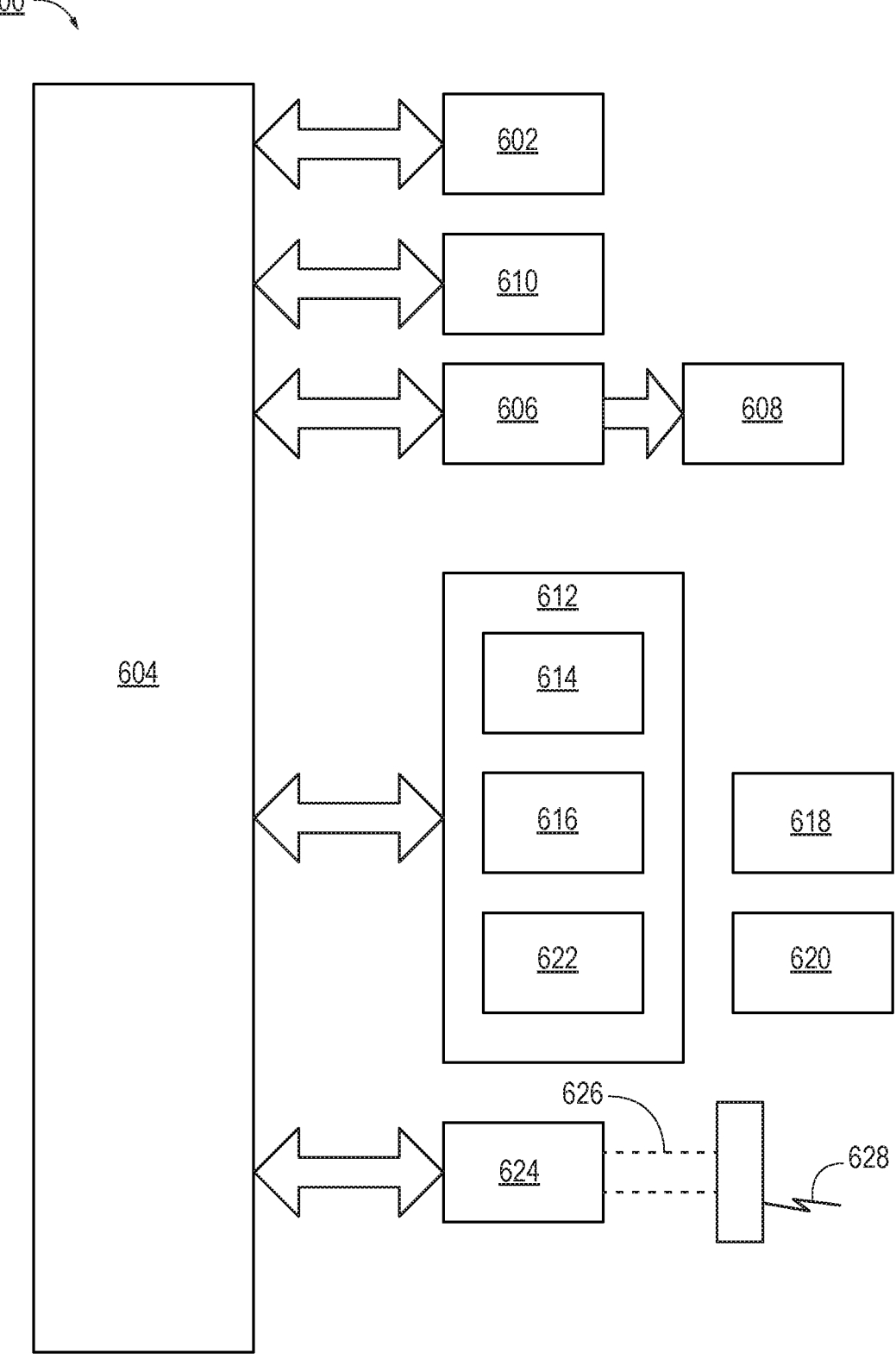
FIG. 6 is a block diagram of a computer system that be used to implement at least a portion of aspects herein.

FIG. 6 illustrates a computer-based system 600 that may constitute, include parts of, or be used to realize one or more of aspects of, e.g., systems or methodologies and techniques described herein. Computer-based system 600 includes at least one processor, such as a processor 602. Processor 602 may be connected to a communication infrastructure 604, for example, a communications bus, a cross-over bar, a network, or the like. Various software aspects are described in terms of this example computer-based system 600. Upon perusal of the present description, it will become apparent to a person skilled in the relevant art(s) how to implement the present disclosure using other computer systems or architectures.

Computer-based system 600 includes a display interface 606 that forwards graphics, text, or other data from communication infrastructure 604 or from a frame buffer (not shown) for display on a display unit 608.

Computer-based system 600 further includes a main memory 610, such as RAM, and may also include a secondary memory 612. Secondary memory 612 may further include, for example, a hard disk drive 614 or a removable storage drive 616, representing a floppy disk drive, a magnetic tape drive, an optical disk drive, etc. Removable storage drive 616 reads from or writes to a removable storage unit 618 in a well-known manner. Removable storage unit 618 may represent a floppy disk, magnetic tape, or an optical disk, and may be read by and written to by removable storage drive 616. As will be appreciated, removable storage unit 618 includes a computer usable storage medium having computer software or data stored therein.

In accordance with various aspects of the present disclosure, secondary memory 612 may include other similar devices for allowing computer programs or other instructions to be loaded into computer-based system 600. Such devices may include, for example, a removable storage unit 620 and an interface 622. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from removable storage unit 620 to computer-based system 600.

Computer-based system 600 may further include communication interface 624. Communication interface 624 may allow software or data to be transferred between computer-based system 600 and external devices. Examples of communication interface 624 include, but may not be limited to a modem, a network interface (such as an Ethernet card), a communications port, a Personal Computer Memory Card International Association (PCMCIA) slot and card, or the like. Software or data transferred via communication interface 624 may be in the form of a number of signals, hereinafter referred to as signals 626, which may be electronic, electromagnetic, optical or other signals capable of being received by communication interface 624. Signals 626 may be provided to communication interface 624 via a communication path (e.g., channel) 628. Communication path 628 carries signals 626 and may be implemented using wire or cable, fiber optics, a telephone line, a cellular link, a radio frequency (RF) link, or other communication channels.

In this document, the terms "computer readable medium," "computer program medium," and "computer usable medium" are used to generally refer to media such as removable storage drive 616, a hard disk installed in hard disk drive 614, or the like. These computer program products provide software to computer-based system 600. The present disclosure is directed to such computer program products. Unless otherwise articulated, such media are intended to be non-transitory.

Computer programs (also referred to as computer control logic) may be stored in main memory 610 or secondary memory 612. The computer programs may also be received via communication interface 604. Such computer programs, when executed, enable computer-based system 600 to perform the functions consistent with the present disclosure, as discussed herein. In particular, the computer programs, when executed, enable processor 602 to perform the features of the present disclosure. Accordingly, such computer programs represent controllers of computer-based system 600.

In accordance with an aspect of the present disclosure, where the disclosure is implemented using a software, the software may be stored in a computer program product and loaded into computer-based system 600 using removable storage drive 616, hard disk drive 614, or communication interface 624. The control logic (software), when executed by processor 602, causes processor 602 to perform the functions of the present disclosure as described herein.

A broad scope and variety of systems, methods, and computer products are disclosed herein. In an example, a method comprises ingesting member service representative (MSR) contact data describing at least one MSR contact event, wherein the MSR contact data is ingested to a contact record having a record format. The method also comprises ingesting contextual data describing context surrounding the at least one MSR contact event, wherein the contextual data is populated to at least one record having the record format. The method also comprises determining a correlation between the MSR contact data and the contextual data using unsupervised machine leaning.

Specific embodiments of the foregoing method can provide additional details. Another example embodiment of the example method can comprise receiving real-time context data, determining a current correlation between the real-time context data and contextual data, determining a predicted MSR demand for a timeframe based on the current correlation, and calculating an MSR staffing level to meet the predicted call volume. Another example embodiment of the method can comprise determining that a current staffing level does not satisfy the MSR staffing level and causing an update to MSR scheduling based on a difference between the current staffing level and the MSR staffing level. Another example embodiment of the method can comprise receiving real-time context data, determining a current correlation between the real-time context data and MSR contact data, determining a predicted MSR demand for a timeframe based on the current correlation, and calculating an MSR staffing level to meet the predicted call volume. Another embodiment of the method can comprise determining a cost of the MSR staffing level and comparing the cost of the MSR staffing level to a cost threshold. Another embodiment of the method can comprise preparing at least one of the MSR contact data and the contextual data according to the record format. In another embodiment of the method, the record format is dynamically updated based on identification of a new field type by the machine learning.

In an example, a system comprises a non-transitory computer-readable medium storing instructions. The instructions are configured to effectuate a data ingestion component configured to ingest: member service representative (MSR) contact data describing at least one MSR contact event, wherein the MSR contact data is ingested to a contact record having a record format, and contextual data describing context surrounding the at least one MSR contact event, wherein the contextual data is populated to at least one record having the record format. The instructions are also configured to effectuate a correlation component configured to determine a correlation between the MSR contact data and the contextual data using unsupervised machine learning.

Specific embodiments of the foregoing system can provide additional details. In another example system, the instructions are further configured to effectuate an MSR staffing sufficiency component configured to calculate a predicted MSR demand for a timeframe based on the correlation, wherein the predicted MSR demand is based on the correlation and real-time context data. In another example system, the instructions are further configured to effectuate an MSR solution component configured to calculate an MSR staffing level to meet the predicted MSR demand based on the correlation and the real-time context data. In another example system, the MSR staffing sufficiency component is configured to compare a current staffing level to the MSR staffing level, and wherein the MSR solution component is configured to cause an update to an MSR schedule based on a difference between a current staffing level and the MSR staffing level. In another example system, the MSR solution component is configured to notify a party regarding a change to an MSR schedule. In another example system, the instructions are further configured to effectuate a data preparation component configured to prepare at least one of the MSR contact data and the contextual data according to the record format, wherein the record format is dynamically updated based on identification of a new field type by the machine learning. In another example system, the instructions are further configured to effectuate an MSR capacity database.

Aspects similar to the example method(s) or system(s) can be embodied in instructions on a computer readable medium or other computer product that when executed or utilized effects processes like those of the method or other systems herein.

In embodiments, one or more methodologies herein can be combined in any order, or aspects of methodologies can be re-ordered. Methodologies or aspects thereof may be performed simultaneously or in conjunction. In this manner, the methodologies described and other aspects of systems can be implemented in integrated manners to provide asset management. Methodologies can proceed iteratively until all anomalies are identified and/or an entire asset or group of assets is inspected. Methodologies herein can proceed iteratively until all anomalies are addressed or further resources are unavailable to address any anomaly.

While systems and methodologies herein are described separately, it is understood that techniques, functionality, routines, and aspects of the systems can be performed by or implemented in the methodologies, and vice versa.

The present disclosure can be implemented in hardware such as, for example, computing hardware and/or application specific integrated circuits (ASIC), software, or combinations of hardware and software. Implementation of a hardware machine, software, or combinations thereof to perform functions described herein will be apparent to persons skilled in the relevant art(s).

Various aspects disclosed herein are to be taken in the illustrative and explanatory sense, and should in no way be construed as limiting of the present disclosure. All numerical terms, such as, but not limited to, "first" and "second" or any other ordinary and/or numerical terms, should also be taken only as identifiers, to assist the reader's understanding of the various aspects, variations, components, or modifications of the present disclosure, and may not create any limitations, particularly as to the order, or preference, of any aspect, variation, component or modification relative to, or over, another aspect, variation, component or modification.

It is to be understood that individual features shown or described for one aspect may be combined with individual features shown or described for another aspect. The above described implementation does not in any way limit the scope of the present disclosure. Therefore, it is to be understood although some features are shown or described to illustrate the use of the present disclosure in the context of functional segments, such features may be omitted from the scope of the present disclosure without departing from the spirit of the present disclosure as defined in the appended claims.

The present disclosure is described in some instances with reference to system architecture, block diagrams, flowchart illustrations of methods, and computer program products according to various aspects of the disclosure. It will be understood that each functional block of the block diagrams and the flowchart illustrations, and combinations of functional blocks in the block diagrams and flowchart illustrations, respectively, can be implemented by computer program instructions or special purpose hardware.

In software embodiments, such software elements may be loaded onto a general-purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory (e.g., a non-transitory computer-readable medium) that can direct a computer or other programmable data processing apparatus to function in a particular manner, such that the instructions stored in the computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer-imple-mented process, such that the instructions that execute on the computer or other programmable apparatus provide steps for implementing the functions specified in the flowchart block or blocks. In an aspect, some or all of the computer program instructions may be executed on any remote-hosted appli-cation framework, for example, by a processor associated with a cloud server.

Accordingly, functional blocks of the block diagrams and flow diagram illustrations support combinations of resources for performing the specified functions, combinations of steps for performing the specified functions, and program instruction means for performing the specified functions. It will also be understood that each functional block of the block diagrams and flowchart illustrations, and combina-tions of functional blocks in the block diagrams and flow-chart illustrations, can be implemented by either special purpose hardware-based computer systems which perform the specified functions or steps, or suitable combinations of special purpose hardware and computer instructions. Fur-ther, illustrations of the process flows and the descriptions thereof may make reference to user windows, web pages, websites, web forms, prompts, et cetera. The illustrated steps described herein may comprise in any number of configu-rations including the use of windows, web pages, hypertexts, hyperlinks, web forms, popup windows, prompts, and the like. It should be further appreciated that the multiple steps as illustrated and described may be combined into single web pages and/or windows but have been expanded for the sake of simplicity. In other cases, steps illustrated and described as single process steps may be separated into multiple web pages and/or windows but have been com-bined for simplicity.

Methodologies herein are described with specific aspects for ease of explanation with respect to various embodiments. However, methodologies embraced under the scope and spirit of the disclosure may vary, to include excluding any of the particular aspects described to define broader or different methods for various use cases or results.

As will be understood, data ingestion, analyses, actions, and communication can be performed or caused as described herein using servers and collective resources, with data transmitted over networks. In this manner, client devices—such as those of the MSRs, MSR managers, or parties contacting MSRs—can achieve the benefits of extensive data and intensive processing without consuming the stor-age, memory, processing power, and bandwidth available to those devices. This provides superior results that cannot be achieved using only a local device on behalf of the user, and does not degrade the user experience as would attempting to achieve even a fraction of the results achieved based on the disclosures herein.

While aspects of the present disclosure have been par-ticularly shown and described with reference to the examples above, it will be understood by those skilled in the art that various combinations of the disclosed aspects or additional aspects may be contemplated by the modification of the disclosed machines, systems and methods without departing from the spirit and scope of what is disclosed. Such aspects should be understood to fall within the scope of the present disclosure as determined based upon the claims and any equivalents thereof.

What is claimed is:
1. A method, comprising:
ingesting member service representative (MSR) contact data describing at least one MSR contact event, wherein the MSR contact data is ingested to a contact record having a record format;
ingesting contextual data describing context surrounding the at least one MSR contact event, wherein the con-textual data is populated to at least one record having the record format, and wherein the contextual data comprises Internet of Things (IoT) device data received from at least one of vehicles or appliances and is indicative of changes in usage patterns of the at least one of the vehicles or the appliances;
determining a plurality of previously-unknown correla-tions between the MSR contact data and the contextual data using unsupervised machine learning;
storing a plurality of correlation entries including param-eters associated with the plurality of previously-un-known correlations;
identifying an additional correlation;
determining, using supervised machine learning and based on similarities between the additional correlation and the plurality of previously-unknown correlations, to revise a given correlation entry of the plurality of correlation entries based on the additional correlation by widening or narrowing a range of parameters for a contextual type of a given previously-unknown corre-lation of the plurality of previously-unknown correla-tions with which the given correlation entry is associ-ated;
analyzing the plurality of previously-unknown correla-tions in reference to one another using the supervised machine learning to identify two or more causative correlations;
receiving real-time context data;
determining at least one current correlation between the real-time context data and contextual data, wherein the at least one current correlation corresponds to at least one of the two or more causative correlations;
determining a predicted call volume during a timeframe based on the at least one current correlation and the real-time context date;
determining a predicted MSR staffing level for a quality of service level during the timeframe based on the predicted call volume;
determining that a scheduled MSR staffing level does not satisfy the predicted MSR staffing level at the quality of service; and
causing an update to MSR scheduling based on a differ-ence between the scheduled MSR staffing level and the predicted MSR staffing level.
2. The method of claim 1,
wherein
the current correlation is based on MSR contact data.
3. The method of claim 1, comprising:
determining a cost of the predicted MSR staffing level; and
comparing the cost of the predicted MSR staffing level to a cost threshold.
4. The method of claim 1, comprising:
preparing at least one of the MSR contact data and the contextual data according to the record format.
5. The method of claim 1, wherein the record format is dynamically updated based on identification of a new field type.
6. A system, comprising a non-transitory computer-read-able medium storing instructions configured to effectuate:
a data ingestion component configured to ingest:
member service representative (MSR) contact data describing at least one MSR contact event, wherein the MSR contact data is ingested to a contact record having a record format, and contextual data describing context surrounding the at least one MSR contact event, wherein the contextual data is populated to at least one record having the record format, and wherein the contextual data comprises Internet of Things (IoT) device data received from at least one of vehicles or appliances and is indicative of changes in usage patterns of the at least one of the vehicles or the appliances;

a correlation component configured to:

determine a plurality of previously-unknown correlations between the MSR contact data and the contextual data using unsupervised machine learning, store a plurality of correlation entries including parameters associated with the plurality of previously-unknown correlations;

identify an additional correlation;

determine, using supervised machine learning and based on similarities between the additional correlation and the plurality of previously-unknown correlations, to revise a given correlation entry of the plurality of correlation entries based on the additional correlation by widening or narrowing a range of parameters for a contextual type of a given previously-unknown correlation of the plurality of previously-unknown correlations with which the given correlation entry is associated; and analyze the plurality of previously-unknown correlations in reference to one another using the supervised machine learning to identify two or more causative correlations;

an MSR staffing sufficiency component configured to determine a predicted MSR demand during a timeframe based on at least one of the two or more causative correlations, wherein the predicted MSR demand is based on the at least one of the two or more causative correlations and real-time context data; and an MSR solution component configured to determine a predicted MSR staffing level to meet the predicted MSR demand at a quality of service level during the timeframe based on the at least one of the two or more causative correlations and the real-time context data, wherein the MSR staffing sufficiency component is configured to compare a scheduled staffing level to the predicted MSR staffing level at the quality of service level, and wherein the MSR solution component is configured to cause an update to an MSR schedule based on a difference between the scheduled staffing level and the predicted MSR staffing level.

7. The system of claim 6, wherein the MSR solution component is configured to notify a party regarding a change to an MSR schedule.

8. The system of claim 6, wherein the instructions are further configured to effectuate:

a data preparation component configured to prepare at least one of the MSR contact data and the contextual data according to the record format, wherein the record format is dynamically updated based on identification of a new field type.

9. The System of claim 6, wherein the instructions are further configured to effectuate:

an MSR capacity database.

10. A non-transitory computer-readable medium storing instructions that when executed by a processor effectuate operations comprising:

ingesting member service representative (MSR) contact data describing at least one MSR contact event, wherein the MSR contact data is ingested to a contact record having a record format;

ingesting contextual data describing context surrounding the at least one MSR contact event, wherein the contextual data is populated to at least one record having the record format, and wherein the contextual data comprises Internet of Things (IoT) device data received from at least one of vehicles or appliances and is indicative of changes in usage patterns of the at least one of the vehicles or the appliances;

determining a plurality of previously-unknown correlations between the MSR contact data and the contextual data using unsupervised machine learning;

storing a plurality of correlation entries including parameters associated with the plurality of previously-unknown correlations;

identifying an additional correlation;

determining, using supervised machine learning and based on similarities between the additional correlation and the plurality of previously-unknown correlations, to revise a given correlation entry of the plurality of correlation entries based on the additional correlation by widening or narrowing a range of parameters for a contextual type of a given previously-unknown correlation of the plurality of previously-unknown correlations with which the given correlation entry is associated;

analyzing the plurality of previously-unknown correlations in reference to one another using the supervised machine learning to identify two or more causative correlations;

receiving real-time context data;

determining at least one current correlation between the real-time context data and contextual data, wherein the at least one current correlation corresponds to at least one of the two or more causative correlations;

determining a predicted call volume during a timeframe based on the at least one current correlation and the real-time context data;

determining a predicted MSR staffing level for a quality of service during the timeframe based on the predicted call volume;

determining that a scheduled MSR staffing level does not satisfy the predicted MSR staffing level at the quality of service; and causing an update to MSR scheduling based on a difference between the scheduled MSR staffing level and the predicted MSR staffing level.

11. The non-transitory computer-readable medium of claim 10, wherein the current correlation is based at least in part on MSR contact data.

12. The non-transitory computer-readable medium of claim 10, wherein the non-transitory computer-readable medium stores instructions that when executed by a processor effectuate operations comprising:

determining a cost of an MSR staffing level; and comparing the cost of the MSR staffing level to a cost threshold.

13. The non-transitory computer-readable medium of claim 10, wherein the non-transitory computer-readable medium stores instructions that when executed by a processor effectuate operations comprising:

preparing at least one of the MSR contact data and the contextual data according to the record format, wherein the record format is dynamically updated based on identification of a new field type.

* * * * *